United States Patent [19]
Adler

[11] 3,929,646
[45] Dec. 30, 1975

[54] SERUM SEPARATOR AND FIBRIN FILTER

[75] Inventor: Stanford L. Adler, Monsey, N.Y.

[73] Assignee: Technicon Instruments Corporation, Tarrytown, N.Y.

[22] Filed: July 22, 1974

[21] Appl. No.: 490,539

[52] U.S. Cl. .......... 210/359; 210/516; 210/DIG. 23
[51] Int. Cl.² .......................................... B01D 33/00
[58] Field of Search 210/83, 84, 359, 516, DIG. 23, 210/DIG. 24

[56] References Cited
UNITED STATES PATENTS

| | | | |
|---|---|---|---|
| 3,448,041 | 6/1969 | Swank | 210/DIG. 23 |
| 3,508,653 | 4/1970 | Coleman | 210/DIG. 23 |
| 3,647,624 | 3/1972 | Evenson | 210/DIG. 23 |
| 3,780,935 | 12/1973 | Lukacs et al. | 210/83 X |
| 3,814,248 | 6/1974 | Lawhead | 210/83 |
| 3,852,194 | 12/1974 | Zine, Jr. | 210/DIG. 23 |

OTHER PUBLICATIONS
S. H. Seal, "Silicone Flotation: A Simple Quantitative Method . . . Blood," Cancer, 1959, Vol. 12, pp. 590-595.

*Primary Examiner*—Charles N. Hart
*Assistant Examiner*—Robert H. Spitzer
*Attorney, Agent, or Firm*—S. P. Tedesco; Stephen E. Rockwell

[57] ABSTRACT

An article for drawing and holding a blood sample and adapted to be centrifuged to thereby position a separator between the packed cell portion of the blood, the heavier phase, and the serum or plasma portion, the lighter phase. The article includes a rigid evacuated tubular container hermetically sealed with a removable resilient stopper, an inner cover element within the container detachably connected to the stopper to be separated therefrom on centrifugation of the blood sample, the element having plural filter openings therein, and a quantity of an inert semifluid sealant in the bottom of the container, the cover element and the sealant each having a specific gravity greater than the serum or plasma portion but less than the packed cell portion. In centrifuged position, the cover element intimately overlies the sealant and is supported from the wall structure of the container by the sealant, the sealant closing the filter openings and forming with the cover element the separator.

3 Claims, 6 Drawing Figures

SERUM SEPARATOR AND FIBRIN FILTER

BACKGROUND OF THE INVENTION

1. Field of the Invention

This invention relates to an article and method for effecting a sealed separation between a serum or plasma portion and a packed cell portion on centrifugation of a whole blood sample.

2. Prior Art

This invention is concerned with an article for receipt of a whole blood sample for centrifugation therein. During centrifugation, separation of the serum or plasma portion and the packed cell portion is accomplished and a separating seal is effected between the two portions. U.S. Pat. No. 3,508,653 issued to Coleman; a serum filter sold by Whale Scientific, Inc. of Denver, Colorado; U.S. Pat. No. 3,780,935 issued to Lukacs et al; and Ayres U.S. Pat. No. 3,779,383 disclose method and apparatus which exemplifies the prior art.

Coleman U.S. Pat. No. 3,580,653 discloses an article which may be sterilized and which includes a rigid tubular container which is evacuated and sealed with a removable resilient stopper. A nonporous, solid piston of resilient material is located in the container and compressed by the side wall thereof, the piston being directly below the stopper and detachably connected thereto. A blood sample is drawn into the container utilizing a double-ended cannula one end of which is inserted into the person from whom the blood sample is to be drawn. The other end of the cannula is then inserted into the container through the stopper and the attached piston. The blood sample is drawn into the container by the vacuum therein. The container is then centrifuged at one speed to separate the serum phase from the cell phase. The speed of centrifugation is then increased to separate the piston from the stopper. The piston has a specific gravity between those of the two blood phases. The piston, normally compressed by the side wall of the container, must be deformed during the last-mentioned step so that it may travel in the container to interface with the cell phase, with the serum being displaced upwardly around the piston. There can be little filtering action of the serum between the wall structure of the container and the piston for removal of fibrin in the sample. Further, the requisite operation of the centrifuge at two speeds is a drawback. Coleman teaches that the piston should not be displaced from the stopper until the serum-cell separation is complete. After centrifugation, the stopper may be removed and the container may be placed in an automated quantitative blood analyzer in which serum is aspirated from the container for analysis through a probe immersible in such serum. The patent states that the piston serves as a permanent barrier which prevents interaction or transfer between the cell phase and the serum phase of the sample. It is known that any such interaction or transfer interferes with analysis of certain blood constituents such as potassium for example.

The aforementioned product of Whale Scientific, Inc. comprises a relatively thin, dished plastic element of disc form with plural air vents therethrough. The device has a circular array of vertically arranged legs integral therewith. In use, any stopper in a tubular container holding a sample of whole blood must first be removed which is time consuming and may lead to loss of sterility. Through the open mouth of the container, the device is then inserted thereacross with forceps or tweezers with the dished face uppermost. The device must be thrust past the bead of the container. The legs of the device cooperate with the side wall of the container tending to prevent tipping of the device therein. The contents may then be centrifuged in the container. Promotional material indicates that as the device is drawn down in the container by the centrifugation step, fibrin and associated particulates become woven into the base of the device and are removed from the serum. It is stated that this material picked up by the device is of greater specific gravity than the device and closes the air vents to prevent upward migration of the cellular material. It is further indicated that at the end of separation by centrifugation, the device is located near the cell phase and is held there by a combination of the specific gravity of the device and the entrapped fibrin atop the cellular mass. It is believed that such fibrin formation may not fully seal the air vents to prevent the aforementioned interaction and transfer from the cell phase to the serum phase. Further, in the use of the device with a blood sample to which an anticoagulant has been added for the purpose of chemically preventing fibrin from forming, the vent holes in the device will not become sealed with fibrin and in such case the packed cells remain in contact with the serum enabling the aforementioned interaction and transfer from the cell phase to the serum phase.

A significant disadvantage in the use of a centrifuged sample of whole blood having the Whale device therein is the fact that when such centrifuged product in the container is utilized in an automated analyzer such as previously characterized, the analyzer probe may strike the device on immersion into the serum or plasma in the container. Such striking of the device may dislodge it owing to the fact that its support is essentially only that of the fibrin and the cellular material below it. Such dislocation of the device would result in the danger of at least some of the formerly packed cells migrating upwardly past the device into the serum portion, resulting in the interaction and transfer characterized above.

According to the disclosure of Lukacs et al U.S. Pat. No. 3,780,935 a tubular container holding a sample of whole blood must first have any stopper therein removed from the container which has the attendant disadvantages previously discussed in connection with the use of the Whale device. The separation of the sample into serum and packed cell portions is effected utilizing an inert sealant consisting essentially of a silicone fluid with a filler, which sealant has a specific gravity between those of the serum phase and the packed cell phase. The separation process includes inserting a dispensing device containing a quantity of the sealant into the mouth of the container for support thereby, the dispenser having a nozzle portion which extends into the sample. The container contents are centrifuged in the container so that they separate into serum and packed cell portions with the sealant therebetween as a barrier. The sealant is viscous and cohesive and is gradually metered out of the dispenser during centrifugation. Such metering results in large surface exposure of the sealant to wetting by the blood sample which may reduce the desirable cohesion of the sealant in the formation of the aforementioned barrier.

Of considerable disadvantage in the use of the product of the Lukacs et al. separation process is the fact that when the product is utilized in the container in an automated analyzer such as previously characterized, the analyzer probe may penetrate the sealant in a manner such that the inlet therein is closed by the sealant. It may be plugged by the sealant. The sealant, which may carry some of the sample, tends to adhere to the probe in a manner to be partly carried away thereby when the probe is withdrawn from the sample and immersed in the liquid of a wash solution reservoir. It may continue to adhere to the probe and continue to carry a portion of the previous sample when the probe is immersed in the next sample. Such sample carry-over contaminates the second sample.

Ayres U.S. Pat. No. 3,779,383 discloses a separator assembly for separating blood into its component parts of a plasma or serum portion and a cellular portion. It utilizes a piston of greater specific gravity than blood and which comprises a resilient portion with selfclosing, normally closed, openings to open as vents on considerable pressure differential. Its disadvantages are the selfclosing, normally closed, openings which may be plugged by the blood components, and a stop which is required to limit movement of the piston.

The present invention overcomes the difficulties associated with the prior art devices and separation methods described above.

SUMMARY OF THE INVENTION

The present invention provides a method for quickly and effectively separating by centrifugation in a container the serum or plasma phase and the packed cell phase of a sample of whole blood and forming a separator therebetween. The separator includes a sealant and an inner cover element of relatively rigid material. The cover element is firmly supported in centrifuged position by the sealant which closely overlies the packed cell phase. The cover element with the sealant effectively resists dislodgement or penetration of the separator if the cover element is struck by the suction probe of an automated blood sample analyzer. Such separator has a specific gravity in a range between those of the serum or plasma phase and the packed cell phase. Accordingly, one object of the invention is to provide an improved method utilizing centrifugation for obtaining from a sample of whole blood a serum or plasma portion for pickup in such a probe.

Further, there is provided an article for such use which includes a rigid evacuated container, for a sample of whole blood, hermatically sealed with a resilient stopper; an inner cover element within the container detachably connected to the stopper to be separated therefrom on centrifugation of the blood sample into a serum or plasma portion and a packed cell portion, the element having a plurality of filter openings therein; and a quantity of inert semifluid sealant in the bottom of the container, the cover element and the sealant each having a specific gravity greater than the serum or plasma portion but less than the packed cell portion.

DETAILED DESCRIPTION OF THE PREFERRED EMBODIMENTS

Figure 1:
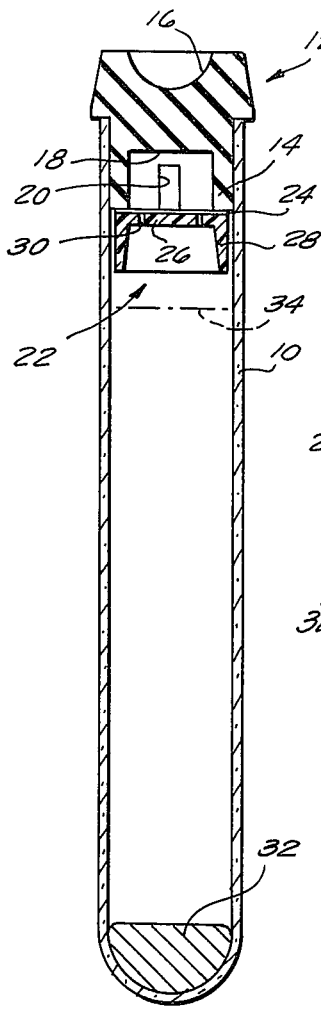
FIG. 1 is a median vertical sectional view of a tubular article embodying the invention, illustrating the same prior to use.

In the article shown in FIG. 1, which may be sterile, there is provided a tubular container 10 having an opening at the top thereof. In a conventional manner, the container is evacuated and closed by a gas-tight resilient stopper indicated generally at 12. The stopper, of elastomeric material, is shouldered as shown to abut the upper end of the container 10, and has a lower portion 14 of reduced cross section extending within the side wall of container and compressed by the latter. The central top surface portion of the stopper 12 is recessed, as at 16, and the stopper has an upwardly extending central recess 18 in the bottom thereof. The recesses 16 and 18 reduce the material of the stopper through which one end of a double-ended cannula must extend to draw a specimen of whole blood into the container 10 in the use of the article. The stopper portion 14 may be upwardly notched at the lower extremity thereof as at 20.

An inner cover element of inverted cup shape, indicated generally at 22, located within the container 10 is secured to the lower extremity of the stopper portion in any convenient manner which enables separation of the element 22 from the stopper on centrifugal force sufficient to separate in the container a specimen of whole blood into a serum or plasma portion and a packed cell portion. An adhesive substance may be utilized for this purpose. An annular layer 24 of such adhesive, one composition of which will be described hereinafter, is interposed between the annular bottom extremity of the stopper and the element wall 26 which extends transversely of the container 10. The inverted cup-shaped cover element substantially fills the cross section of the container 10 and has a side wall 28. The last-mentioned side wall may have an outer surface of uniform diameter from top to bottom. The inner surface of such side wall preferably tapers so that the last-mentioned surface narrows the inner diameter of the cup in an upward direction.

Figure 4:
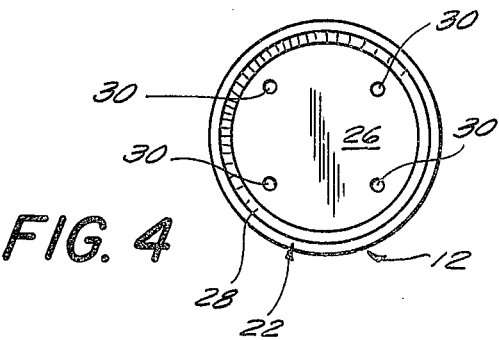
FIG. 4 is a view looking in the direction of the arrows 4—4 of FIG. 3.

The wall 26 of the cover element has plural openings 30 therethrough. As indicated in FIG. 4, there may be four of such openings 30 for example. The openings 30 may be in circular array and may be located a distance outwardly from the central region of the wall 26 as shown so that there is considerable spacing of the openings 30 from each other. The thickness of the wall 26 may be in the range of .094 inch to .125 inch and each opening 30 may have a diameter in the range of .010 inch to .040 inch, depending on the number of openings. The height of the inner cover element 22 should be at least half the diameter thereof to prevent tipping and binding of the element 22 in the container 10 when the element is freed from the stopper 12 and is descending in the container during the centrifugation process. During such descent, owing to its specific gravity, the openings 30 enable air and blood serum to pass through the element 22. While fibrin strands in the serum below the element 22 are of smaller diameter than the openings 30, they have sufficient length and random orientation and coalescence in the blood serum that they effectively tend to be prevented from upward passage through the openings 30 on centrifugation of the blood sample. When the inner cover element 22 is supported from the stopper 12, the openings 30 permit passage therethrough of whole blood into the container 10 on drawing of the blood from the individual. Such filling of the container 10 will be described more fully hereinafter.

The inner cover element 22 has a specific gravity greater than the serum phase but less than the packed cell phase of a centrifuged sample of whole blood. The specific gravity of the element 22 should be at least 1.026 and less than 1.092, and preferably in the range of 1.030 and 1.060. The material of the element 22 must not interfere with blood chemistry quantitative tests such as for albumin, glucose, cholesterol, SGOT and many others, and in this sense such material should be inert. The element 22 may be structered of polyethylene or polypropylene with a filler such as glass powder to adjust to the desired specific gravity. Ethyl cellulose, polystyrene and some synthetic rubbers formulated to the desired specific gravity are suitable for such use.

The article of FIG. 1 includes a relatively viscous sealant 32 in the bottom of the container 10 which is placed therein prior to evacuation and stoppering of the container. The sealant 32 has the same specific gravity as the inner cover element 22 and has other properties such as adhesiveness and cohesiveness. The sealant includes, in addition to a filler to supply an adjustment of specific gravity and provide structural support for the sealant, an inert semifluid a formulation of which is as follows:

EXAMPLE

|  | Parts by weight |
| --- | --- |
| Petroleum jelly | 100.0 |
| Low density polyethylene | 2.0 |
| Medical grade mineral oil | 25.0 |
| Vinyl resin (grade 40) | 0.2 |

The filler is preferably a random dispersion in the semifluid of a quantity of relatively very fine glass fibers having a length in the approximate range of .062 inch to .125 inch. Other inert fillers may be used of appropriate specific gravity such as Teflon with a specific gravity of 2.15. The volume of the inert sealant 32 of such combination of constituents is preferably in the range of 15% to 20% of the volume of the container 10 to the imaginary fill line thereof indicated at 34.

Alternatively, the sealant 32 may have a different composition. One such sealant consists essentially of a semifluid silicone with an inert filler such as powdered silica. Such semifluid silicone is made by Union Carbide Corporation and is identified by the designation L-45. The last-mentioned inert filler is utilized for adjustment of the specific gravity of the sealant to that desired. Such combination of the semifluid silicone with such silica is described in detail in the aforementioned Lukacs et al U.S. Pat. No. 3,780,935.

The annular layer 24 of adhesive supporting the inner cover element from the stopper 12 may conveniently have the same composition as the sealant 32. When it is desired to prevent clotting of the blood sample within the container 10 so that centrifugation of the sample effects separation of a plasma phase for sample analysis rather than a serum phase, a non-illustrated anticoagulant is added to the container 10 in the assembly of the article. Such anticoagulant is added after placing of the sealant 32 in the container and normally lies on the surface of the sealant prior to use of the article. The sealant normally adheres to the bottom of the container 10 in the normal upright position of the article prior to use. Such adhesion of the sealant, coupled with its cohesiveness and relatively high viscosity, effectively tend to prevent any dislocation of the sealant such as to plug the openings 30 in the inner cover element 22 in normal handling of the article prior to its use.

The use of the article of FIG. 1 will now be described. One end of a conventional double-end cannula which cannula has a conventional support such as described in the aforementioned Coleman U.S. Pat. No. 3,508,653 is inserted into the person from whom a blood sample is to be drawn. The other end of the cannula is then inserted into the central portion of the stopper to extend into the upward recess 18 thereof in communication with the interior of the container 10. It is stopped short of the inner cover element 22 by abutment of the cannula support with the top of the stopper 12. Blood is drawn into the container 10 by the vacuum therein, passing the inner cover element 22 through the openings 30 therein. Sufficient blood is drawn so that when the article is later held upright after the drawing of the blood, the container is filled to the aforementioned imaginary line 34. At the end of such filling, the cannula is withdrawn from the person and the cannula is withdrawn from the container 10 and stopper 12. The stopper recloses the opening therein made by the cannula. The article, which may be sterile, is then a stoppered tube containing a blood specimen. If serum is sought for analysis, there is none of the aforementioned anticoagulant present in the container 10 to inhibit fibrin formation and the article is allowed to stand for a period of about 20 to 40 minutes in order to effect some phase separation or clotting prior to placing the article in a centrifuge.

Upon centrifugation at normal acceleration, unlike the centrifuge operation required according to Coleman U.S. Pat. No. 3,508,653 the sealant 32 is dislodged from the bottom of the container 10 and rises flowing in the container owing to its specific gravity differential with the cellular material, and the inner cover element 22 is separated from the stopper 12 and descends in the container as previously described owing to its specific gravity differential with the blood serum. It is to be understood that while the foregoing is taking place, the lighter blood phase, the serum, is displaced upwardly through the openings 30 of the descending element 22 displacing the trapped fibrin downwardly in its descent, and the heavier blood phase, the cellular material, is descending in the container. At the end of such separation of such blood phases, the sealant 32 and the cover element 22 have come together in the location in the container and manner shown in FIG. 2, forming a physical separator between such phases. The separator closely overlies the then packed cells.

Figure 2:
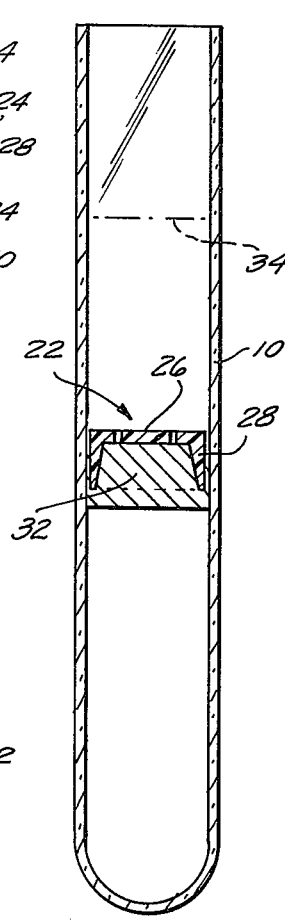
FIG. 2 is a similar view illustrating the separator in the position it occupies in the tube after centrifugation of a sample of whole blood therein, and illustrating the condition of the article in which, subsequent to centrifugation, the stopper has been removed.

In the formation of such separator on the meeting of the cover element 22 with the sealant 32, a quantity of the sealant 32 enters the cavity defined by the walls 26 and 28 thereof. It is to be understood that at the time of such entry the cavity has already entrapped fibrin therein. The sealant 32 closes the openings 30 in the wall 26 but cannot pass through the such openings owing to their size, the thickness of the wall 26 and the aforementioned physical properties of the sealant 32. The cavity in the inner cover element 22 is filled with the sealant 32. Further, the sealant extends below the element 22 across the inner diameter of the container 10 as shown in FIG. 2, forming an impervious barrier between the blood phases. In addition, in such formation of the separator, a small quantity of the sealant 32 forms a sealing portion between the wall 28 of the cover element and the side wall of the container 10. In this manner the separator is very firmly supported in its phase separating position. The stopper 12 may remain in the container 10 until it is desired to decant the serum or, alternatively, utilize the container 10 with the serum therein in an automated blood sample analyzer.

The unstoppered article in the condition of FIG. 2 may be placed in such automated analyzer for removal of the blood serum phase through a non-illustrated conventional aspirating probe of the analyzer immersible in the serum. Such a probe may drop with the assistance of gravity a limited distance into a sample container for immersion in serum. If the probe on such movement strikes the separator in the container it must strike the relatively rigid wall 26 of the inner cover element in the central portion thereof, which wall portion, free of sealant on its upper surface, effectively resists penetration by the probe and dislocation from its firmly supported position. If the lower end of the probe is flat and is open to provide an inlet therethrough, the upper surface portion of the wall 26 in the area of contact with the probe may be indented to provide in this area a non-illustrated gridlike surface portion which will not occlude the probe inlet if the probe comes to rest on such gridlike surface portion. However, such gridlike surface portion is not necessary if the probe has a lateral inlet in the lower end portion thereof. After such use in a blood analyzer, the container 10 with the remaining contents may be discarded conveniently.

It will be understood from the foregoing that if plasma is desired for analysis instead of blood serum, the aforementioned anticoagulant is present, placed in the container 10 in the aforementioned manner. As previously pointed out, this prevents fibrin formation. The sample on centrifugation separates into plasma and packed cell phases with the aforementioned separator therebetween. In the case of plasma or serum, the separator prevents any transfer between such lighter blood phase and the heavier packed cell phase after centrifugation.

Figure 5:
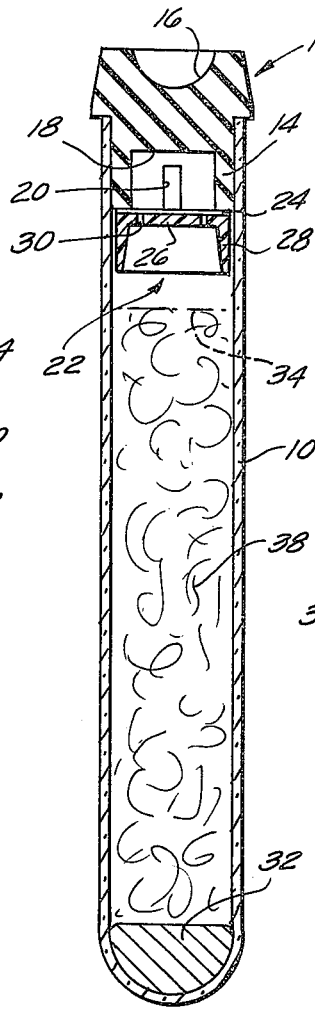
FIG. 5 is a view similar to FIG. 1 but illustrates a modified form of the article.

The modified form of the article of FIG. 5 is the same in all respects to the article of FIG. 1 except that the article of FIG. 5 includes an added element in the form of a quantity of random fibrous material 38 of glass placed in the container 10 after the placement therein of the sealant and prior to evacuation of the container. Such fibrous material 38 is located above the sealant 32 and no anticoagulant is present in the container. Such fibrous material is relatively loose and open, that is, unpacked. The fibrous material 38 may be proportional by weight to the volume of the cubic centimeters of the blood sample added to the container 10 in the use of the article, such as 8.0 to 12.0 mg. of fibrous material 38 for 10 ml of blood sample.

Figure 6:
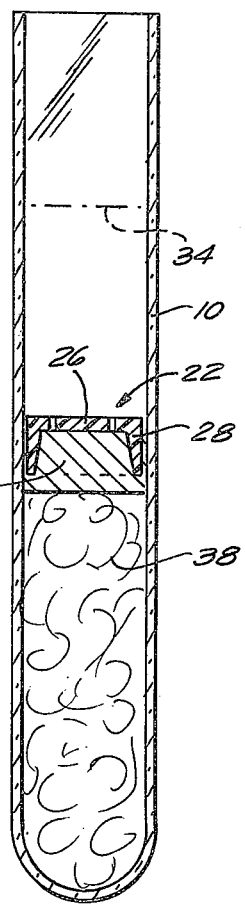
FIG. 6 is a view of the article of FIG. 5 in the condition of FIG. 2.
Figure 3:
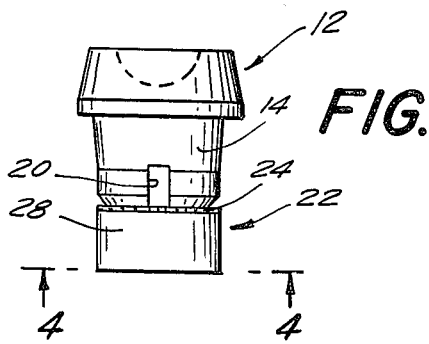
FIG. 3 is a side elevational view of the stopper assembled with the inner cover element, prior to insertion of the assembly in the tube.

The addition of the fibrous material to the article hastens the clotting of blood therein. Such glass material is known to have this characteristic, and the blood clots around this material encapsulating it. On centrifugation of the article of FIG. 5 holding a blood specimen, the serum-cell separator is formed as previously described with reference to the form of FIG. 2 and as shown in FIG. 6. It is to be understood that in the centrifuged blood sample, the fibrous material 38 is located in the packed cell phase.

While the separation of the form of FIG. 1 has been described with reference to blood and a cellular phase thereof, the invention is equally applicable to the separation of other substances from one another such as two liquid phases of different specific gravities. For example, oil may be separated from water by centrifugation, utilizing an inner cover element and an insoluble sealant, both of an intermediate specific gravity. Another application of the separator resides, for example, in the separation for analysis of ova and cysts from other fecal materials. This may be accomplished by floatation of suspended fecal material including ova and cysts of intestinal parasites in a liquid of one specific gravity overlaid on a liquid in the container having a different specific gravity. The separation of the ova and cysts from other heavier fecal material is by centrifugation utilizing an inner cover element and a sealant comprising a semifluid, and thereby forming a barrier between the cysts and ova in one of the liquids and the heavier fecal material in the other. The inner cover element and the sealant may be as described, with adjustment for the appropriate specific gravity intermediate the specific gravities of the two liquids.

While several forms of the invention have been illustrated and described, it is to be understood, especially by those versed in the art, that the invention may take other forms and is susceptible of changes in details without departing from the principles of the invention.

What is claimed is:

1. An article for use for the centrifugal separation of a blood sample into a plasma or a serum portion, constituting a lighter phase, and a cellular portion, constituting a heavier phase, for the formation of a barrier therebetween, comprising: a tubular container having an open outer end and a closed inner end; an inner cover element of relatively rigid material in said container adjacent said open end, said cover element comprising a platform-forming transverse relatively thin wall portion substantially filling the cross section of said container and at its circumferential extremity a depending relatively thin side wall portion having an inner surface tapering so as to narrow toward said transverse wall portion, said transverse wall portion defining straight-through plural normally open filter and vent openings dimensioned to pass said phases, said wall portions together defining a cavity, the height of said said inner cover element being at least half the diameter thereof, and a sealant comprising a semifluid in said container closed end, said cover element and said sealant having respective specific gravities intermediate the respective specific gravities of said two phases, so that on separation of said two phases said sealant forms a barrier therebetween with said sealant sealing against said container and further sealing against at least the inner surface of said side wall structure and occluding said vent openings.

2. An article as defined in claim 1, further including a quantity of fibrous glass material in said container intermediate said inner cover element and said sealant.

3. An article as defined in claim 1, wherein: said sealant is in a volume sufficient that said sealant fills said cavity when in said barrier.

* * * * *